Patented Nov. 27, 1934

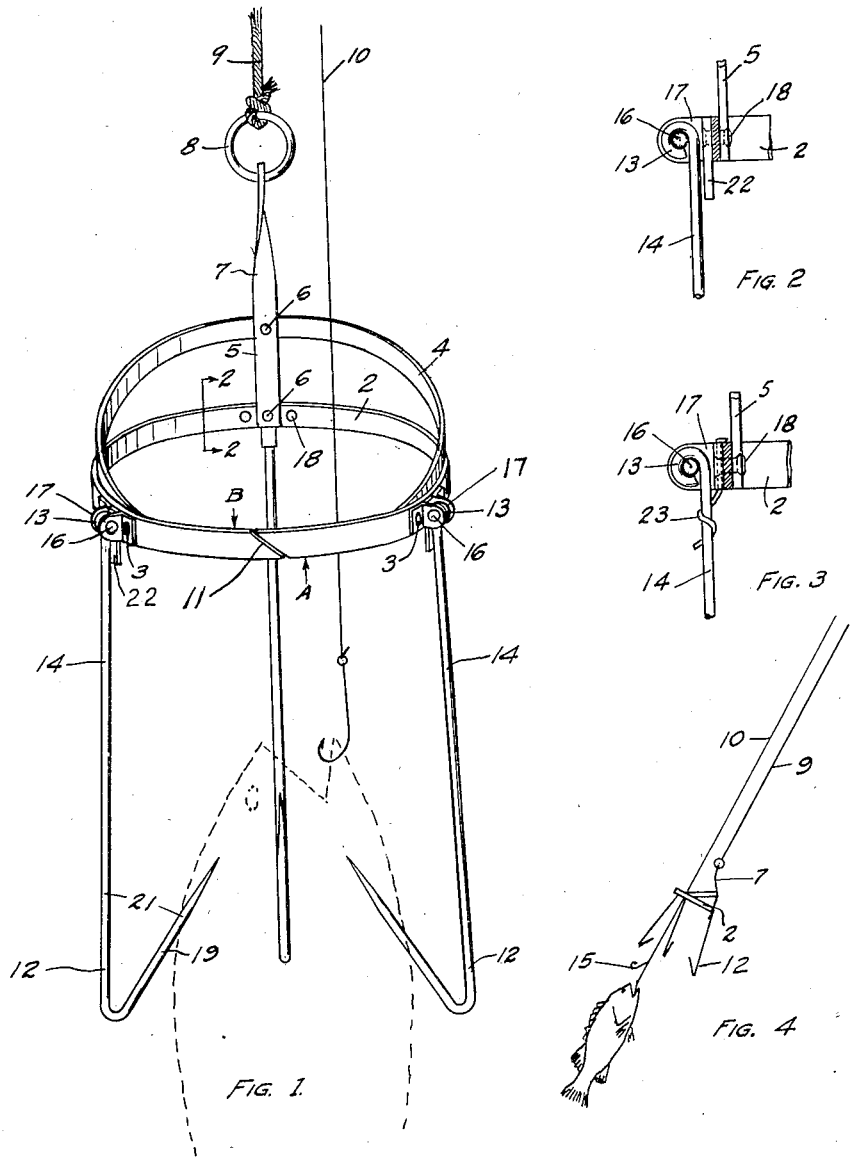

1,982,132

UNITED STATES PATENT OFFICE 1,982,132

GRAPNEL

Arthur L. Boles, Oakland, Calif.

Application April 21, 1933, Serial No. 667,173

3 Claims. (Cl. 43—5)

My invention relates to a device for grappling an object suspended on a line or cord, and particularly to a grappling or gaffing device useful to fishermen.

An object of my invention is the provision of a grapnel that will enable fishermen, who have successfully played a heavy fish with light tackle from a station elevated above the water, such as a wharf or bank, to grapple and land the fish.

Another object of my invention is the provision of a grapnel which may be safely employed on exceedingly heavy fish, such as giant Mississippi River mud cat, Jew fish, or sharks, from a small boat or skiff without the danger of the fisherman being flipped overboard by the fish diving under the boat such as exists when a pole gaff is employed.

Another object of my invention is the provision of a grapnel which may be readily engaged with a fishing line, which acts as a guide; and without unduly jeopardizing the operator's hands.

Another object of my invention is the provision of a grapnel which will readily and securely engage the fish and which may be readily disengaged.

A further object of my invention is the provision of a grapnel which may be easily transported.

Referring to the drawing:

Figure 1 is an elevation of a preferred embodiment of my invention.

Figure 2 is a fragmentary detail, partly in section and taken on the plane and viewed as indicated by the arrows 2—2 of Figure 1, and showing one method of attaching the hook shanks to the frame.

Figure 3 is a fragmentary detail similar in nature to that of Figure 2, but showing a variant method of attaching the hook shanks to the frame.

Figure 4 is a fragmentary schematic and perspective view illustrating the manner in which the grapnel slides down the line to engage the fish.

In terms of broad inclusion the grapnel of my invention comprises a frame having a suitable supporting linkage affixed to one side thereof, and a plurality of hooks pivotally attached to the opposite side. Also associated with the frame is suitable guiding means whereby the grapnel may be constrained to slide along a cord such as a fishing line. The mechanism attaching the hooks to the frame preferably includes a constraining device such as a lug or a spring that will serve to prevent the hooks from collapsing inward to such an extent that a fish's nose would not pass between them.

All sporting devotees of the piscatorial art are ambitious to use as lightly constructed tackle as is compatible with a particular variety of fish. A comparatively light line may have sufficient strength to play a heavy game fish while he is in the water, but will frequently fail when the fish must be lifted therefrom. Countless vacations have been utterly ruined by the big one getting away just as he was about to be landed. To prevent such grievous occurrences, it has become the practice to use tackle sufficiently strong to yank even the biggest ones incontinently from the water. The use of a heavy line, however, necessitates the use of a proportionately heavy sinker; and, as a result, a fish hooked on such tackle wears himself out lugging around the attached deadweight instead of being free to direct his skill and strength against that of his would be captor. This condition obviously robs the sport of a great part of its pleasure.

Furthermore the use of a pole gaff of the ordinary sort from a wharf, bridge, bank, or similar station relatively high above the water is an unsatisfactory process at best. One is apt to strike or gaff one's companions with such an unwieldy device. Or, worse still, the awkwardly wielded pole frequently pushes the fish to freedom as often as it effects a landing. This situation results in the regrettable use of too heavy a tackle, as above mentioned, to the material detriment of fishing as a sport.

A fisherman equipped with the grapnel of my invention can use tackle only strong enough to turn the hooked fish in its long rushes. He must match his skill and strategy against the fighting instincts of the fish in an unhandicapped contest. And yet, when the fish is finally brought alongside, the grapnel of my invention insures a successful landing.

In terms of greater detail the grapnel of my invention includes a frame which may be formed, as shown in Figure 1, of an annular ring 2 having fixed thereto by means of the rivets 3 a segmental member 4. The ring 2 and segmental member 4 are preferably angularly disposed with respect to each other to give greater strength; and are so held and reinforced by a cross member 5 affixed thereto by rivets 6.

A suitable supporting linkage for the device is conveniently formed by an extension 7, of the cross member 5; and a ring 8 attached to and adjacent the end of extension 7. A supporting line 9 may then be attached to the ring 8 to provide a medium for raising and lowering the device.

In this preferred form of my invention ring 2 also serves to guide the grapnel along the fishing line 10. To attain this result ring 2 is preferably split diagonally as at 11. Rings 2 and 4 are preferably made of a resilient corrosion and rust resistant material such as spring bronze or stainless steel, in which event the split 11 is normally closed but may be sprung open to pass the fishing line 10 to the inside of ring 2 by exerting transverse pressure on the opposite sides of the split as indicated by the arrows A and B. Or, split 11 may be permanently opened to a sufficient width to pass the line 10, in which event the labyrinth formed by the diagonal slope of the split prevents ring 2 from slipping off line 10. A wide passage is preferably left through ring 2 to permit the sliding of the grapnel over anterior hooks such as hook 15 of Figure 4 when several hooks are employed on the line.

The engaging means proper, of the grapnel, comprises the hooks 12 which are pivotally attached to the frame through the medium of the loops 13 formed in the upper end of the shanks 14 where they are engaged by the pins 16 fixed in the pin brackets 17 which are in turn held on the ring 2 by the rivets 18. In order to facilitate the slipping of the hooks over and past the nose of the fish when the grapnel is lowered the hooks are preferably of a shape wherein the tangs 19 of the hooks form an acute angle 21 with the hook shanks 14. This construction gives a wider angle between the juxtaposed hooks thus permitting the ready engagement of large fish; tends to pull the hooks in toward the center for an increasingly secure grip after the grapnel has slipped down into place, and the grappling is actually accomplished by pulling in on the line 9; and permits the ready disengagement of the grapnel after the fish is landed. To further facilitate disengagement the hooks are also preferably barbless, as shown.

It is desirable that the hooks be pivotally mounted as above described so that they may swing outward and slide down over the fish's nose and head, and also so that they may be pulled inward as the hooks sink into the fish. It is most undesirable, however, to have the hooks unconstrained in their motion so that they may swing inward to such an extent that the hooks cannot properly engage the fish. To obviate that difficulty I prefer to constrain the inward movement of the separate hooks with respect to the frame and to each other so that there is always an open central angle between them.

One method for thus constraining the movement of the hooks is shown in Figure 2 in which the pin bracket 17 is provided with a depending lug 22 against which the inner side of the hook shank 14 presses when the hook is at its inner limit of travel. The lugs 22 are preferably so proportioned and disposed as to permit the hooks to swing in toward the center sufficiently to get a secure grip on the fish, but not so far as to close the central opening between the several hooks.

A variant method of attaining this same result is shown in Figure 3 in which the inner movement of the hook must be made against the resistance of a spring 23 interposed between the hook shank 14 and the pin bracket 17. In their unstressed positions the several springs hold the hooks out from the center so as to preserve the desired open space between them. Then when the grapnel is used and the hooks are pulled in toward the center the springs yield to permit the movement.

To further insure the passage of the hooks down over the fish's nose to effect engagement, the weight distribution and support of the grapnel is preferably such that the center of the opening between the hooks coincides approximately with the longitudinal axis of line 10. This is best illustrated in Figure 4, in which view it can be seen that extension 7 is bent inward so that the mass of the grapnel as a whole pulling downward against the resistance of line 9 and against the sliding pivot existing at the point of contact between ring 2 and line 10, forms a turning couple of force lying in the plane of lines 9 and 10. By varying the tension on line 9 and manipulating its position with respect to line 10 the fisherman can thus bring the hooks to bear in any direction essential to the successful employment of the device under the varying conditions arising from the manner in which the fish is hooked.

I claim:

1. A grapnel comprising a frame, a spring closed split ring associated with said frame, a supporting linkage attached to said frame, and a plurality of hooks pivotally attached to said frame.

2. A grapnel comprising a frame having guiding means associated therewith, a supporting linkage attached to said frame, a plurality of hooks pivotally attached to said frame, and constraining means associated with said frame and said hooks limiting the relative inward movement thereof.

3. A grapnel comprising a frame having guiding means associated therewith, a supporting linkage attached to said frame, a plurality of hooks pivotally attached to said frame, and a spring interposed between said frame and said hooks limiting the relative inward movement thereof.

ARTHUR L. BOLES.